United States Patent [19]

Lowe

[11] 3,959,908

[45] June 1, 1976

[54] LIVESTOCK IDENTIFICATION TAG

[76] Inventor: Robert R. Lowe, P.O. Box 518, Nanton, Alberta, Canada, T0L 1R0

[22] Filed: May 23, 1975

[21] Appl. No.: 580,445

Related U.S. Application Data

[63] Continuation of Ser. No. 467,337, May 6, 1974, abandoned.

[52] U.S. Cl. ............................................. 40/301
[51] Int. Cl.² ..................................... G09F 3/00
[58] Field of Search.................... 40/301, 300, 302; 85/DIG. 2

[56] References Cited
UNITED STATES PATENTS

| | | | |
|---|---|---|---|
| 3,334,433 | 8/1967 | Gospodnetich | 40/301 |
| 3,388,492 | 6/1968 | Nichols, Jr. | 40/301 |
| 3,552,051 | 1/1971 | Ritchey | 40/301 |
| 3,605,310 | 9/1971 | Brown | 40/301 |

*Primary Examiner*—John H. Wolff
*Attorney, Agent, or Firm*—W. John McClenahan

[57] ABSTRACT

An ear-type livestock identification tag comprises a planar member having a body and a neck, the neck extending outwardly from the body and adapted for insertion through an animal ear, and a tab member adapted for locking onto the terminal end of the neck. The curvature and length of the neck is such that the body of a tag having the neck mounted, close to the head, in an animal ear lies below the ear and roughly parallel to the animal's cheek. Identifying indicia on the tag body is easily read since the body lies parallel to the cheek, and there is little accidental tag loss since the neck is anchored in a thick part of the ear.

2 Claims, 3 Drawing Figures

LIVESTOCK IDENTIFICATION TAG

This is a continuation of application Ser. No. 467,337 filed May 6, 1974, now abandoned.

BACKGROUND OF THE INVENTION

1. Field of the Invention

The present invention relates to a novel livestock identification tag of the type which is mounted in an animal's ear. More specifically the tag comprises a planar member having a body and a neck which extends outwardly from the body and which is inserted through an animal's ear; and a tab member which locks onto the terminal end of the neck to retain the tag in position.

The novel tag is particularly well suited for use as a cattle marker, although its use is not limited thereto.

2. Description of the Prior Art

Most prior art ear-type livestock identification tags are constructed and mounted such that the tag face is parallel to the length of the ear. Such a tag is exemplified in Ritchey Canadian Patent No. 844,828, issued June 23, 1970.

Two problems are commonly encountered with prior art ear-type livestock identification tags. Firstly, it is usual to insert a tag through an animal ear in a spot midway or further from the head and, in order to minimize accidental pull-out of the tag, in a position inward of the ear edge. With cattle, it is in fact common to insert the tag in a space lying between cartilages which essentially run the length of a cow's ear. A tag so positioned is often difficult to read because the tag face lies against the ear and hair may curl over all or part of the tag face, and because the midportion to outer end of a cow's ear moves about considerably when the animal twitches the ears. Secondly, even though an effort is made to minimize accidental tag pull-out by placing the tag between ear cartilages, there is still a substantial amount of tag loss since the tag is mounted in a relatively thin portion of the ear, when taken in cross-section, and since the further the placement of the tag from the head the greater the likelihood of the tag engaging fencing or other entanglements as the tagged cow searches for greener pastures.

SUMMARY

The present invention provides an ear-type livestock identification tag which comprises a planar member having a body and a neck, the neck extending outwardly from the body and adapted for insertion through an animal ear, and a tab member adapted for locking onto the terminal end of the neck. The tag is intended primarily for insertion of the neck through an animal ear in a position close to the head such that the tag body lies below the ear and roughly parallel to the animal's cheek. As in the prior art, it is preferable to place the tag between longitudinally extending cartilages, but it is not essential.

The neck of the tag may include a shoulder member in an intermediate position on the neck and adapted to bear against the animal ear when the neck of the tag is inserted therethrough. It may further include a second shoulder member on or adjacent the terminal end of the neck. Such a second shoulder member must of course be of a shape and dimensions that it can be inserted through the animal ear along with the tag neck, and is useful for the purpose of securing the tab member to the neck in order to fix the tag in place in a recipient's ear.

The above described tag overcomes the deficiencies of the prior art structures in that it is easier to read as it hangs below the ear and roughly parallel to the animal's cheek; it is affected less by ear twitching as it is mounted closer to the head; and it is less likely to be accidentally pulled out since it is inserted through a thicker section of the ear and since a cow is more likely to protect the inner portions of the ear than the outer portions, speaking with respect of the head.

BRIEF DESCRIPTION OF THE DRAWINGS

One embodiment of the present invention is illustrated in the accompanying drawings, wherein.

DESCRIPTION OF THE PREFERRED EMBODIMENTS

Figure 1:
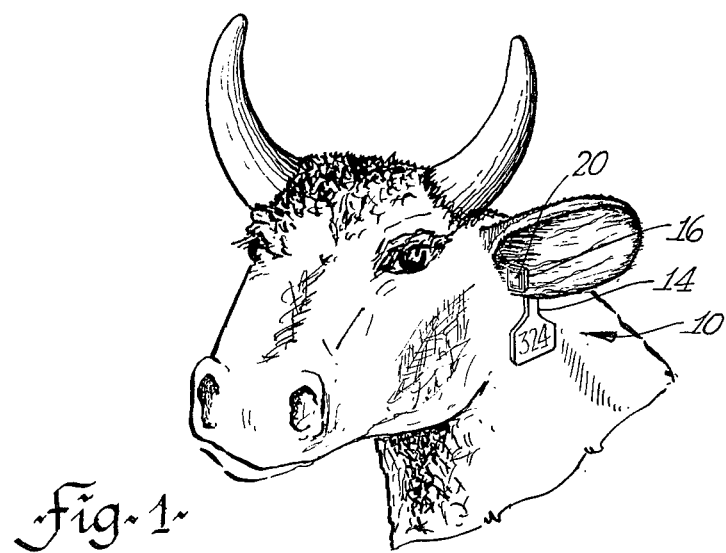
FIG. 1 is a perspective view showing the novel tag mounted in a cow's ear.

The novel livestock identification tag is shown generally in all Figures as 10; the same reference numerals being used for the same elements in all Figures.

Referring now to FIG. 1, the planar tag 10 includes a body 12 and a neck 14. A tab member 16 locks onto the terminal end of neck 14 in order to maintain the tag in position, as illustrated, mounted in the cow's ear. It is to be noted from FIG. 1 that the body of the tag hangs below the ear and roughly parallel to the animal's cheek. It is to be further noted that the neck 14 of the tag extends through the ear near the cow's head, that being one of the thickest parts of the ear.

Figure 2:
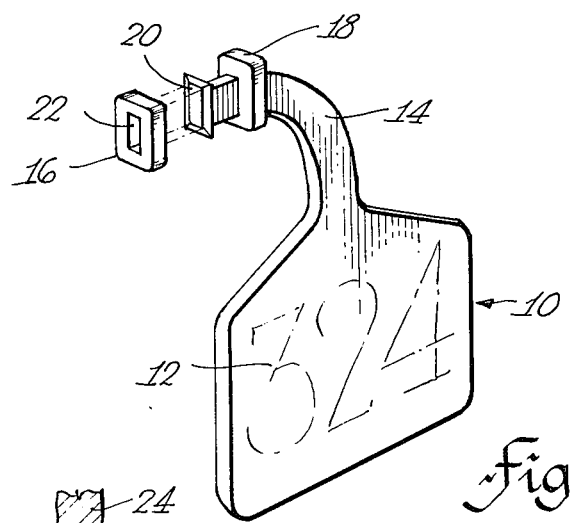
FIG. 2 is an exploded view of the same tag in an enlarged perspective.

Referring to FIG. 2 for detail, it may be seen that neck 14 extends outward from the body 12 in an inverted smooth curved L-form, the neck portion outward of the curve being provided in an intermediate position with spaced first shoulder member 18 and second shoulder member 20, the latter being about or adjacent the terminal end of neck 14. Shoulder 20 is of dimensions lesser than shoulder 18, for reasons to be described later.

Tab member 16 has an aperture 22 in order that tab 16 may be press fit over shoulder 20 of neck 14, thereby locking the tab member on or about the terminal end of neck 14.

Figure 3:
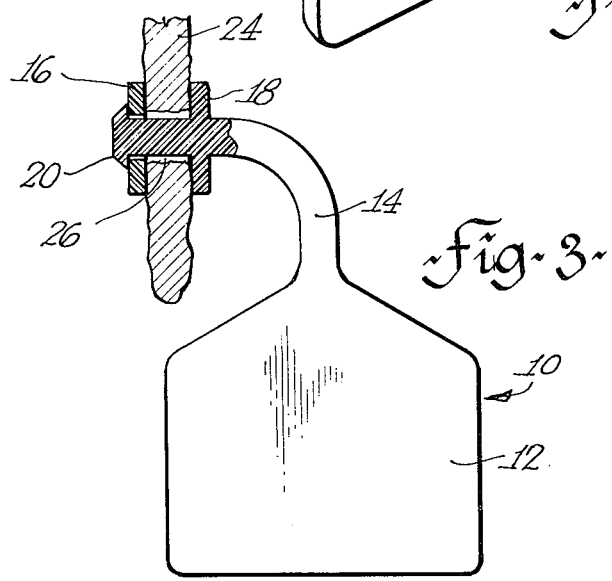
FIG. 3 is a front elevation of the tag mounted in a cow's ear, shown in cross-section.

The tag 10 is shown, in FIG. 3, fixed in place in a cow's ear 24. It can be seen that the neck extends through the ear in a hole 26, which is normally punched expressly for the purpose.

Application of an identification tag according to the present invention is quite simple. The hole 26 is punched in the ear 24 in an appropriate place relatively close to the animal's head. The terminal end of neck 14, including shoulder 20, is pushed through hole 26 until shoulder 18 abuts a face of the ear. Tab member 16 is then force fit over shoulder 20, thereby locking the tag in place, as shown in FIG. 3. The fact that shoulder 20 must be inserted through hole 26 is the reason that the dimensions of shoulder 20 are less than those of shoulder 18.

As is shown in FIGS. 1 and 2, the tag body can bear identifying indicia such as the reference numeral "324" and may additionally bear information such as the year of birth, etc. Use of differently coloured tags or different body shapes also increases the amount of information that any given tag passes along to a viewer.

Tags may be made of various materials although the most suitable presently readily available are tough plastics.

It is to be appreciated that the actual method of identification used on the tag, the shape of the tag body, the material from which the tag is made, etc., have no bearing on the actual invention made but simply represent parameters or variations well known to a person skilled in the art.

The prior art deficiencies described previously are overcome by the planar tag of the invention which when in use presents a readily-viewed body extending beneath an animal's ear and lying roughly parallel to and adjacent the animal's cheek.

The term "planar" is intended to mean "a body lying within two relatively closely spaced apart lines, when viewed in cross-section". The term is intended to include situations where the tag neck is of thickness larger than that of the tag body, or vice versa. The term is also seen to include embodiments where the tag body is wafer-like, as shown, but where the tag neck is circular or semi-circular in cross-section. Similarly, the actual shape or size of the hole 22 in tab member 16 is immaterial as long as it co-operates with the terminal end of the neck 14 to lock thereabout.

The degree or sharpness of the curvature of neck 14, and the length thereof, may be varied as long as the body of the tag hangs roughly parallel to the animal's cheek in a position beneath the ear.

Tags according to the present invention can be easily manufactured out of plastics through molding technology well known in the art.

The embodiments of the invention which have been described and illustrated are not to be construed as limiting since it is obvious that many modifications or alterations to the invention may be made without departing from the true broad scope thereof.

What is claimed is:

1. A livestock identification tag, comprising a planar member having a body and a curved neck extending outwardly from said body and terminating in a terminal end, the neck including a first shoulder member normal to said planar member and spaced from said terminal end and a second shoulder member normal to said planar member and of lesser dimensions than said first shoulder member located adjacent the neck terminal end, and an apertured tab member adapted to be force fitted over the said second shoulder member to lock about the tag neck.

2. A livestock identification tag comprising a planar member having a body and a neck, the neck having an inner portion extending outwardly from the tag body and a terminal portion extending substantially at a right angle to the inner portion and terminating in a terminal end, the terminal portion including a first shoulder member normal to said planar member and spaced from said terminal end and a second shoulder member normal to said planar member and of lesser dimensions than said first shoulder member located adjacent the neck terminal end, and an apertured tab member adapted to be force fitted over the said second shoulder member to lock about the tag neck.

* * * * *

UNITED STATES PATENT OFFICE
CERTIFICATE OF CORRECTION

Patent No. 3,959,908            Dated June 1, 1976

Inventor(s) Robert R. Lowe

It is certified that error appears in the above-identified patent and that said Letters Patent are hereby corrected as shown below:

On the cover page, between

"(63) Continuation of Ser. No. 467,337, May 6, 1974, abandoned." and "(52) U.S. Cl. ............ 40/301" insert -- (30) Foreign Application Priority Data Dec. 27, 1973  Canada ............. 188,954 --.

Signed and Sealed this

Thirty-first Day of August 1976

[SEAL]

Attest:

RUTH C. MASON
*Attesting Officer*

C. MARSHALL DANN
*Commissioner of Patents and Trademarks*